F. W. PHILLIPS.
TAXIMETER.
APPLICATION FILED MAR. 12 1920.

1,438,853.

Patented Dec. 12, 1922.
8 SHEETS—SHEET 1.

Inventor
Fredrick William Phillips
By Henry ...
atty.

FIG.6.

F. W. PHILLIPS.
TAXIMETER.
APPLICATION FILED MAR. 12 1920.

1,438,853.

Patented Dec. 12, 1922.
8 SHEETS—SHEET 4.

Inventor.
Fredrick William Phillips.
Atty.

F. W. PHILLIPS.
TAXIMETER.
APPLICATION FILED MAR. 12 1920.

1,438,853.

Patented Dec. 12, 1922.
8 SHEETS—SHEET 6.

Inventor
Fredrick William Phillips.
By
Atty

Patented Dec. 12, 1922.

1,438,853

UNITED STATES PATENT OFFICE.

FREDRICK WILLIAM PHILLIPS, OF BEXLEY HEATH, ENGLAND.

TAXIMETER.

Application filed March 12, 1920. Serial No. 365,372.

*To all whom it may concern:*

Be it known that I, FREDRICK WILLIAM PHILLIPS, a subject of the King of Great Britain, residing at No. 5 Harcourt Villas, Harcourt Road, Bexley Heath, in the county of Kent, England, have invented certain new and useful Improvements in or Relating to Taximeters, of which the following is a specification.

This invention comprises improvements in or relating to taximeters or fare registering and indicating apparatus for hired vehicles and the like, and has for its principal objects to provide improved mechanism for enabling the various functions and operations of the taximeter to be effected and, generally, to simplify the construction and reduce the number of parts as compared with taximeters now in use.

The present improvements particularly relate to the control of the flag shaft for setting the various parts of the mechanism as may be required, to the mechanism for actuating the main driving spindle which is driven by one of the road wheels or by the clock, as is customary, to the transmitting mechanism between this main driving spindle and the registering mechanism or indicator dials, to the transmitting mechanism between the dials themselves, and to the arrangement of the dials whereby large numerals or figures are possible so that very clear indication is obtained.

According to this invention, the flag shaft is rotatable step-by-step in one direction only and is not oscillatory, and the various mechanisms operated and controlled by the flag shaft are so modified and devised that great simplicity and reliability are attained in connection with this "one direction" flag movement. Locking means are provided for the flag shaft, and these means ensure, in a very simple manner, that the flag shaft shall turn in one direction only, that it shall not move more than one step at a time, and that any step must be completed before it is possible to again operate the locking means in the direction for releasing the flag shaft for the performance of the next step. The main driving spindle, as is usual, is connected with the road drive so as to be revolved only when the vehicle travels forwards and is also connected with the clock so as to be driven by the latter whenever the speed of the vehicle falls below a predetermined minimum or, whenever the vehicle is at rest and waiting for the passenger's convenience. Now, the front end of this spindle carries a flanged disc or a circular track formed with a gap, and a transmission lever engages such flange or track when the flag is turned to the hired position, in such a manner that, during the working off of the minimum fare value, the transmission lever is supported upon the revolving flange or track but as soon as the minimum fare value has been worked off, the gap in the flange or track comes opposite the lever and the supporting device on such lever falls through the gap in the flange and thereafter engages a star wheel or suitably pointed cam which intermittently operates the transmission lever according to the speed and distance covered or according to the time of waiting. At the termination of the hiring, the main driving spindle must be re-set ready for the commencement of the next hiring. These improvements provide accordingly, a sort of zeroizing action for re-setting the main driving spindle so that the gap in the flange is brought to the correct position for the commencement of a hiring, and a declutching action for putting the spindle in a condition to be so re-set or zeroized. In order to enable the road drive to over-run the clock, a transmission pinion in the clock train is carried by a lever arm so that the said pinion may be lifted out of mesh with a pinion on the main driving spindle. When the road drive is faster than the clock, therefore, the pinion carried by the arm rides up over the teeth of the pinion on the main driving spindle. When the clock drive is to be cut out completely, after a hiring is terminated, the said arm is lifted by a mechanical movement for the purpose of taking its pinion out of mesh with the pinion on the main driving spindle. In order that the clock drive may overrun the road drive, there is a road-driven pinion loose on the main spindle and adapted to be engaged or clutched with a ratchet fixed on the main spindle by means of a pawl or pawls. For the purpose of cutting out the road drive at the termination of a hiring, mechanical means are provided, under control of the flag shaft and adapted for releasing the said pawl or pawls from the ratchet and thereby declutching the main driving spindle. The transmission from the main driving spindle to the dial of lowest fare denomination, is distinguished by a hingedly mounted pin, roller or projection on the transmission lever adapted for engaging with the flange of the disc aforesaid and for passing through the gap and thereafter engaging with the star wheel or pointed cam. The transmission lever being caused to rise and fall owing to this engagement with the star wheel, imparts motion to a spring operated lever carrying a feed pawl operative upon a ratchet in connection with the said dial and in operative contact with the transmission lever. At each revolution of the said dial, a cam in connection therewith operates a lever for permitting a spring operated pawl lever to feed a second dial, for the next higher or intermediate fare denomination by one step, and the re-setting of such feed pawl lever is accomplished by an operative connection with the transmission lever aforesaid. This method of driving enables large dials to be employed so that large figures or numerals may be used at the peripheral portions of such dials, and a very clear reading or indication is secured thereby. A third dial for showing a higher or the highest fare denomination is suitably driven from the second dial by cam and feed pawl lever, and this third dial is advantageously mounted concentrically with the second dial and preferably in a central circular recess formed in such second dial. The flag shaft is preferably revolved in three steps, in the following order, namely from the "For hire" position to the "Hired" position, from the latter to a "Stopped" position, and from this last position back to the "For hire" position. In the "Stopped" position, the flag shaft operates a cam which causes a brake or stop to be effective upon the balance wheel or other part of the clock mechanism, so as to stop the clock and prevent it from increasing the amount shown by the dials. The road drive, however, is not interfered with so that if the driver should continue to drive his fare with the flag in the "Stopped" position the amount shown by the dials would be increased by the road drive. The release of detents and feed pawls from their ratchets, the declutching of the main driving spindle, the rendering inoperative of the transmission lever, the cutting out of the clock drive, and the zero-izing of the money dials and re-setting of the main driving spindle are all performed by cam and lever action controlled by the flag shaft when moved to the "For hire" position as hereinafter described. Counting mechanisms are provided, operated by suitable transmissions, for showing the number of times that the flag shaft has been set to "Hired", for showing the number of increments of fare added by the action of the transmission lever, and for showing the total number of miles covered by the vehicle and transmitted to the road drive. A slide plate bearing the three designations "For hire", "Hired" and "Stopped", is mounted at the front of the meter and is operated by cam and lever mechanism from the flag shaft so that the appropriate designation is brought opposite an aperture according to the setting of the flag shaft.

The invention will now be described with reference to the accompanying drawings in which for the sake of convenience the apparatus is shown adapted to the pounds sterling system. It will be understood, however, that the decimal or other money system may be equally well adopted according to the country in which the taximeter is to be used, without departing from the spirit of the invention.

The mechanism is mounted on two principal frame plates or discs, namely, a front plate $a$ and a back plate $b$. $c$ is the main driving spindle of the taximeter deriving motion either from the road wheel or from the clock in the following manner. The drive from the road wheel is suitably communicated to the worm shaft $d$, see Figures 1 and 3, the worm $e$ thereon meshing with a worm wheel $f$ loosely mounted on a short spindle $g$. The worm spindle $d$ is mounted in suitable brackets $h$ on the back plate $b$ and the short spindle $g$ is mounted in a bearing on the back plate $b$. The worm wheel $f$ is fitted with a spring pawl $k$, Figure 3, engaging a ratchet $l$ fixed to the short spindle $g$. The pawl $k$ ensures that the taximeter is driven only during forward motion and not during reverse motion of the vehicle. A pinion $m$ Figures 1 and 3, also is fixed to the spindle $g$ and meshes with a transmission wheel $n$ revolubly mounted on the spindle $c$. The transmission wheel $n$ is fitted with two spring-operated pawls $o$, Figures 11 and 12, which, when permitted to operate as hereinafter described, engage with a ratchet $p$ fixed to the main driving spindle $c$. The latter has also fixed to it a pinion $q$ which is driven from the clock driven spindle $r$ by pinions $s$ and $t$, see Figures 1 and 6. The pinion $t$ is carried by an arm $u$ pivoted to the front plate $a$ at $v$ and is capable of an up and down motion which is limited by the slot $w$ in the arm $u$ taking over the hub of the pinion $s$. Therefore it is possible for the pinion $t$ to go out of mesh with the pinion $q$, when the arm $u$ is lifted, while remaining in mesh with the pinion $s$. When the speed of the vehicle is less than six miles per hour, or any other suitable minimum speed, it is arranged that the number of revolutions per minute imparted to the spindle $c$ and ratchet $p$ from the clock, through the pinions $s$ $t$ $q$, is greater than the number of revolutions imparted to the transmission wheel $n$ from the road drive, so that, in such circumstances, the ratchet $p$ over-runs the pawls $o$ and the clock drives the meter. When the speed of the vehicle exceeds the chosen minimum the pawls $o$ drive the ratchet $p$ and, consequently, the pinion $q$ has a greater peripheral speed than is imparted to it by the clock through the pinions $s$ $t$. The teeth of the pinion $t$ then ride up on the teeth of the pinion $q$, the arm $u$ permitting the pinion $t$ to rise as aforesaid, so that, in this way, the pinion $q$ over-runs the pinion $t$ when the vehicle is driving the meter.

Figure 11:
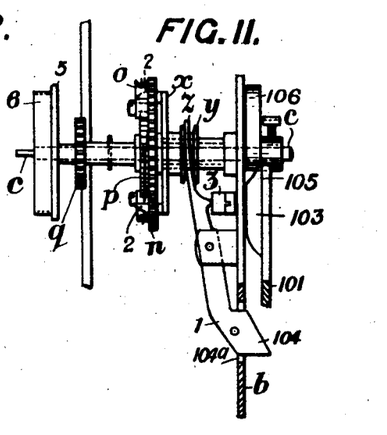
Figure 11 is an elevation of the main driving spindle and its declutching and resetting mechanism as seen when looking in the direction of the arrows XI Figures 3 and 10.
Figure 12:
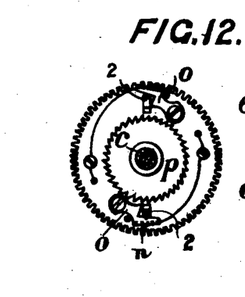
Figure 12 is a detail view of the ratchet and pawl clutch on the main driving spindle.

Behind the transmission wheel $n$ is a disc $x$, see Figure 11, which is loose and slidable with respect to the main spindle $c$, the disc $x$ having a hub sleeve on which are collars $y$ between which the forked end $z$ of a lever 1 engages. The disc $x$ is fitted with two projections 2, see also Figure 12, which enter slots formed in the transmission wheel $n$ at the points where the pawls $o$ are situated. If the lever 1 be permitted, by means hereinafter described, to operate under the action of a blade spring 3, see also Figure 3, to cause the disc $x$ to approach the wheel $n$, the projections 2 pass through the slots and move the pawls $o$ outwards from the centre and out of engagement with the teeth of the ratchet $p$, as seen in Figure 12, so that the ratchet $p$ is not driven by the transmission wheel $n$. If the said means operate, however, so that the fork $z$ is moved to the right of Figure 11, against the action of the spring 3, the projections 2 are withdrawn and the pawls $o$ are permitted to engage the teeth of the ratchet $p$ and to communicate the road drive to the main spindle $c$. Also, for cutting out the clock drive, means are provided for engaging a hook or projection 4, Figures 1 and 6, on the arm $u$ and lifting the latter so as to take the pinion $t$ out of mesh with the pinion $q$.

On the front end of the spindle $c$, there is secured a disc 5, Figures 1, 3, 5, 6 and 11, having a horizontal peripheral flange 6 formed with a gap 7. Against this disc 5 and within the flange 6 there is a star wheel 8 (omitted in Figure 3) fixed to the main spindle $c$. Suppose the minimum fare to be eight pence, and that increments of two pence have to be indicated at the end of each quarter of a mile, or after the lapse of every two and a half minutes if the vehicle is standing or traveling at a speed lower than the minimum. In this case, the star wheel 8 has four points, as shown, each point being adapted to operate a lever for increasing the indication by two pence, as now about to be described.

Figure 1:
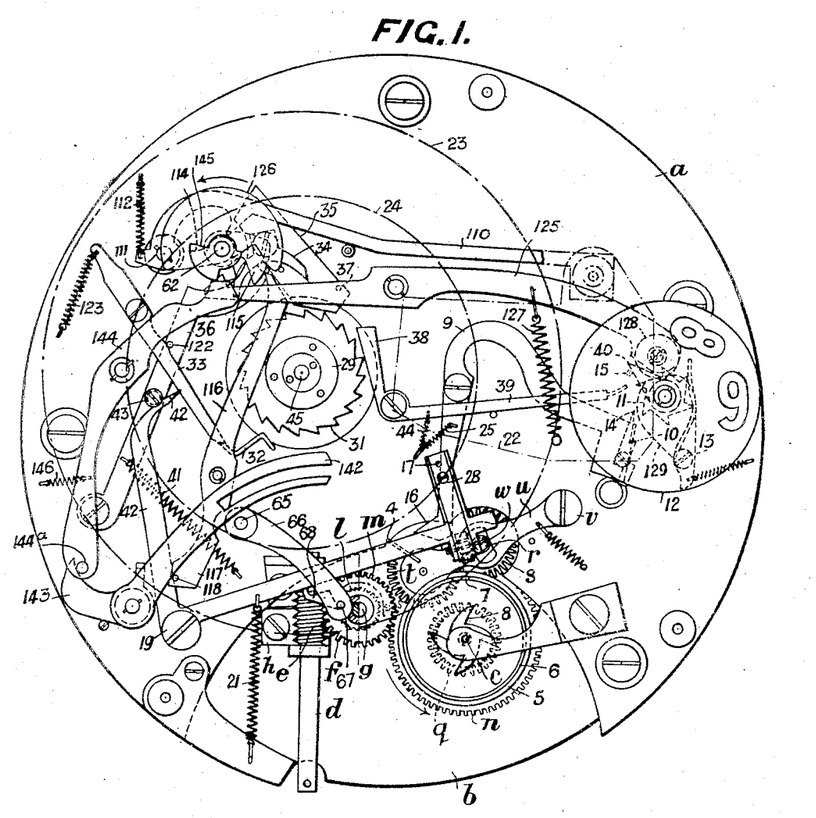
Figure 1, is a front elevation of the taximeter removed from its casing and showing the various parts in the position which they occupy during the "For hire" position of the flag.
Figure 2:
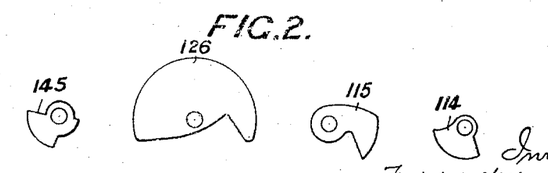
Figure 2 is a series of cams set out after removal from the flag shaft.

9 (Figures 1 and 6) is a lever on the front plate and may be called the pence lever as it carries a pawl 10 at one end adapted for engaging a ratchet 11 on the spindle of the pence dial 12. The latter is normally held in any adjusted position by a spring-operated arm 13 (Figure 1) bearing against the teeth of the ratchet 11, but this arm 13 does not prevent or hinder the zeroizing hereinafter described. The pawl 10 is formed with an extension 14 which, at the conclusion of every feed stroke, passes between a pin or stop 15 and the ratchet 11 and prevents the stroke from exceeding that which is required for feeding the ratchet 11 one step or tooth. The tail of the pence lever 9 is formed with a heel 16, which, during feed action is engaged by a pin 17 on an upward extension of a transmission lever 18 pivoted on the front plate at 19. The transmission lever 18 has a roller 20, clearly seen in Figure 5, situated so that it bears upon the flange 6 of the disc 5 just behind the gap 7, as will be understood from Figure 1, when the flag is lowered at the commencement of a journey or hiring, as hereinafter described. The main spindle c is driven by the road drive or by the clock, as aforesaid, so that the disc 5 turns in the direction of the arrow and the gap 7 moves away from the roller 20, the latter running upon the flange 6, owing to the downward pull by a spring 21 on the transmission lever 18. The circumferential length of the flange 6 is calculated so as to correspond with the value of the minimum fare, as for example a mile travelled at a speed above six miles per hour, or ten minutes of waiting or slow travel. The turning of the flag to the "Hired" position, also raises a shutter 22 from a position in which it obscures a reading of the pence dial 12 and the shillings and pounds dials 23 and 24 respectively, and if the minimum fare is eight pence, the raising of the shutter 22 displays the pence dial 12 set for indicating eight pence and the pounds and shillings dials set at zero, all as hereinafter explained. Consequently, the transmission lever 18 being upheld by the flange 6 until the gap 7 comes opposite the roller 20 on the lever 18, the pence lever and dial will not be operated until the value of the minimum fare has been worked off. When the gap 7 comes under the roller 20, the latter drops through the gap 7 and into a depression between two points of the star wheel 8. The pin 17 on the transmission lever 18 operates, in its descent, against the inclined edge of the heel 16 and turns the pence lever 9 through a sufficient angle for feeding the pence dial 12 round one step so that it will show ten pence. As the main spindle c and star wheel 8 continue to revolve, the points or teeth of the star wheel 8 alternately raise and lower the transmission lever 18, the pence dial being set forward one step each time that the lever 18 is lowered, as will be readily understood. The actual feeding of the pence dial is not, therefore, suddenly thrown upon the clock, but is performed by the power gradually stored up in the lever 18 and its spring 21 during the revolution of the star wheel 8. A small spring 25 returns the pence lever 9 after each feed operation. Upon the journey or hiring being completed, the turning of the flag to the "For hire" position effects, amongst other things, a raising of the transmission lever 18 to an inoperative position, as seen in Figure 1, and as hereinafter explained, and in order that the roller 20 may be able to pass over the flange 6 during such raising, it is carried upon an axle pin 26, see Figure 5, which is hinged at 27 in a lug on the lever 18, the axle pin 26 being normally kept in a horizontal position by a blade spring 28. When the lever 18 is raised and the roller 20 meets the flange 6, the roller turns the pin 26 on its hinge 27 and flexes the blade spring 28 as the roller 20 wipes over the flange 6. When the roller 20 is clear of the flange 6, the spring 28 quickly returns it to the horizontal position, so that it is ready for its next descent on to the flange 6.

Figure 6:
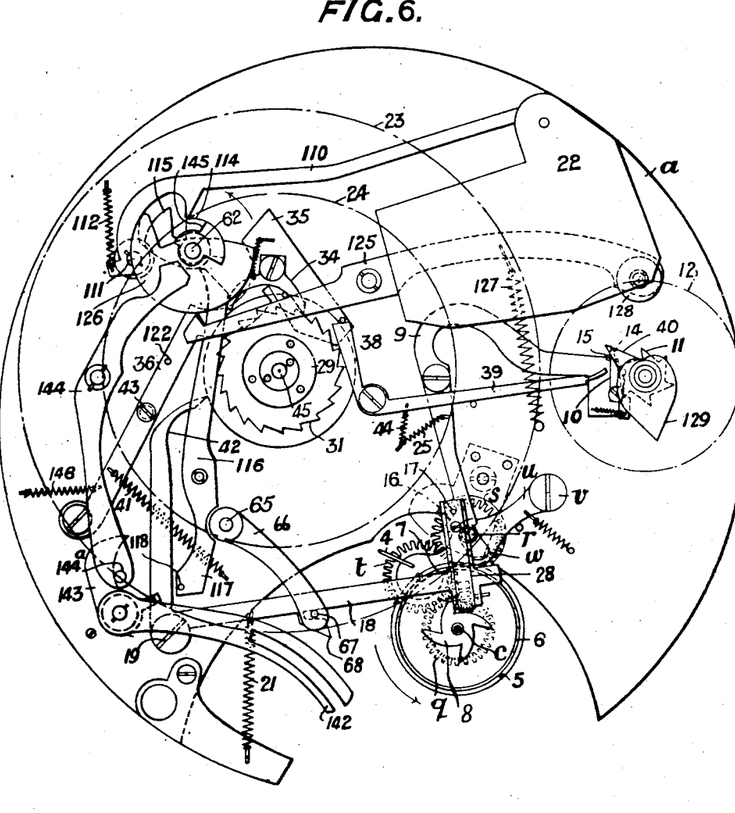
Figure 6 is a front elevation of the front frame plate with certain parts removed and the remainder in positions which they occupy during operation in the course of a journey or hiring.
Figures 7, 8:
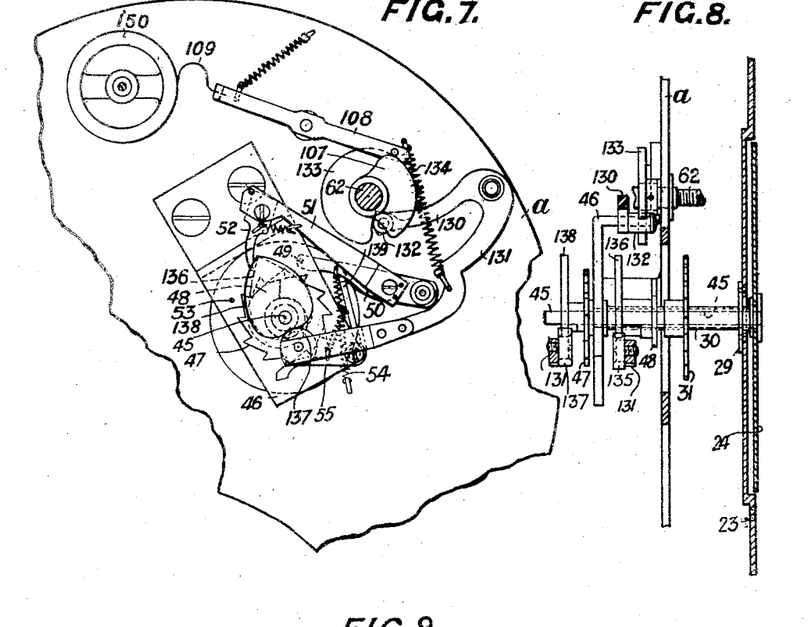
Figure 7 is a rear elevation of a portion of the front frame plate showing mechanism in connection with the pounds and shillings dials.
Figure 8 is a side elevation of Figure 7.

The shillings dial 23 is connected with a flange 29, see Figures 1, 6 and 8, on a hub sleeve 30 of a ratchet 31. Backward motion of the dial 23 is prevented by a detent 32 carried by a lever 33, see Figure 1. The step-by-step feed of the dial 23 is imparted by a feed pawl device 34 of the escapement variety mounted on an end plate 35 of a lever 36. A pin 37 on the end plate 35 normally rests upon the upwardly presented end edge of the tail 38 of an angle lever 39 in operative relation with a cam 40 on the spindle of the pence dial 12. When the latter is advanced from ten pence to the next step, which is one shilling, the amount must be indicated by "1" on the shillings dial 23 and zero on the pence dial 12. During this advance, and subsequently on the completion of each revolution of the pence dial, the cam 40 operates the lever 39 so that its tail 38 is removed from beneath the pin 37. A spring 41 is then free to operate the lever 36 so that the pawl 34 feeds the ratchet 31 and the shillings dial 23 round by one step. In order to re-set the lever 36 ready for the next feed operation, when the pence dial has completed another revolution, the transmission lever 18 is fitted with a tail 42 engaging a roller or projection 43 on the lever 36, so that when the next point of the star wheel 8 raises the lever 18, the tail 42 of the latter presses back the lever 36 and raises the feed pawl 34. The cam 40 having now passed the lever 39, the latter is free to be returned by a spring 44 into the position in which the edge of the tail 38 lies beneath the pin 37, so that upon the following descent of the transmission lever 18, the lever 36 is pulled by its spring 41 until the pin 37 is arrested by the edge of the tail 38 of the lever 39.

The pounds dial 24 is concentric with the shillings dial 23 and is preferably situated in a circular recess in the shillings dial 23, as seen in Figure 8, being fixed to a spindle 45 on which the hub sleeve 30 of the shillings dial is mounted. The spindle 45 is revolubly mounted in a bracket 46 on the back of the front plate, as seen in Figures 7 and 8, and behind the bracket 46 a ratchet wheel 47 is fixed on the spindle 45. On the hub sleeve 30 and behind the ratchet 31 there is formed or fixed a snail or other suitable cam 48 in operative engagement with a pin or projection 49 on a lever 50, pivoted on the back of the front plate a. The arm 51, which is fixed to the lever 50, carries a pivoted feed pawl 52 for engaging the ratchet 47, a fixed pin 53 on the bracket 46 engaging the shaped outer edge of the pawl 52 and preventing a feed motion of more than one tooth of the ratchet 47. A spring 54 connected with the lever 50, normally keeps the same in engagement with the cam 48 and produces the feed of the pounds dial each time that the pin or projection 49 drops over the declivity of the cam 48. On the rear of the bracket 46 is a pivoted spring-operated detent 55 for normally preventing reverse motion of the pounds ratchet 47 and dial 24.

Figure 10:
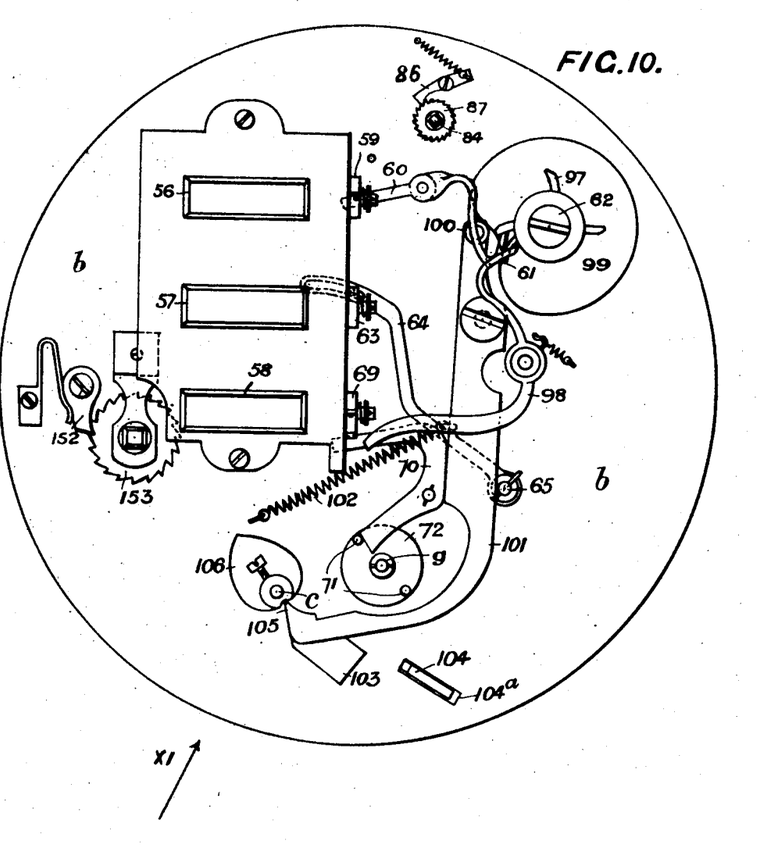
Figure 10 is a rear view of the rear plate showing the counters for counting the flag operations, increments and mileage as well as a mechanism for declutching and re-setting the main driving spindle.

On the rear face of the back plate b there is mounted a triple counter or like mechanism, see Figure 10, comprising the three counters 56, 57 and 58, adapted for counting from zero up to 9999. The counter 56 is adapted for counting the number of revolutions of the flag shaft, the counter 57 is adapted for counting the number of increments of two pence or operations of the transmission lever 18, and the counter 58 is for counting the total mileage run by the vehicle, as, for example, by counting and indicating the number of quarter miles. The counter 56 has a small spring-operated tappet lever 59 at the side, in operative relation with a double armed lever 60 mounted on the rear face of the back plate b. A projection 61 on the flag shaft 62 is adapted to operate the lever 60 at each revolution of the flag shaft 62 for the purpose of counting the said revolutions. The counter 57 has a small tappet lever 63 at the side in operative engagement with the slotted end of a lever arm 64 fixed to the rear end of a spindle 65 which passes through the rear plate b and front plate a. To the front end of the spindle 65, is fixed a lever arm 66, see Figures 1 and 6, having a pin or projection 67 adapted to be engaged by a slotted projection 68 on the transmission lever 18, when the latter descends to its lowest position, as seen in Figure 6, upon the passing of the roller 20 through the gap 7 in the flange 6 and into operative engagement with the star wheel 8. Thus, upon the initial, and every subsequent, descent of the roller 20 into the depth between any two points of the star wheel 8, the corresponding descent of the transmission lever 18 will depress the lever arm 66 owing to the pin and slot engagement at 67, 68. Consequently, the rear lever arm 64 on the spindle 65 will be depressed and will operate the tappet lever 63 to increase the total indicated by the counter 57 by a unit for each full descent of the transmission lever 18. The counter 58 has a small tappet lever 69 in operative relation with one arm of a double-armed bent lever 70 pivoted on the back plate b and having its other arm in the path of the tappet pins 71 on a disc 72 fixed to the rear end of the short spindle g receiving the road drive through the worm e and worm wheel f. The pins 71 are so disposed that they operate the lever 70 and counter 58 at the completion of each quarter of a mile covered by the vehicle running forwardly, consequently the counter 58 will totalize and indicate the mileage covered by the vehicle irrespective of whether the flag is in the "Hired", or "Stopped" or "For hire" position.

Figure 3:
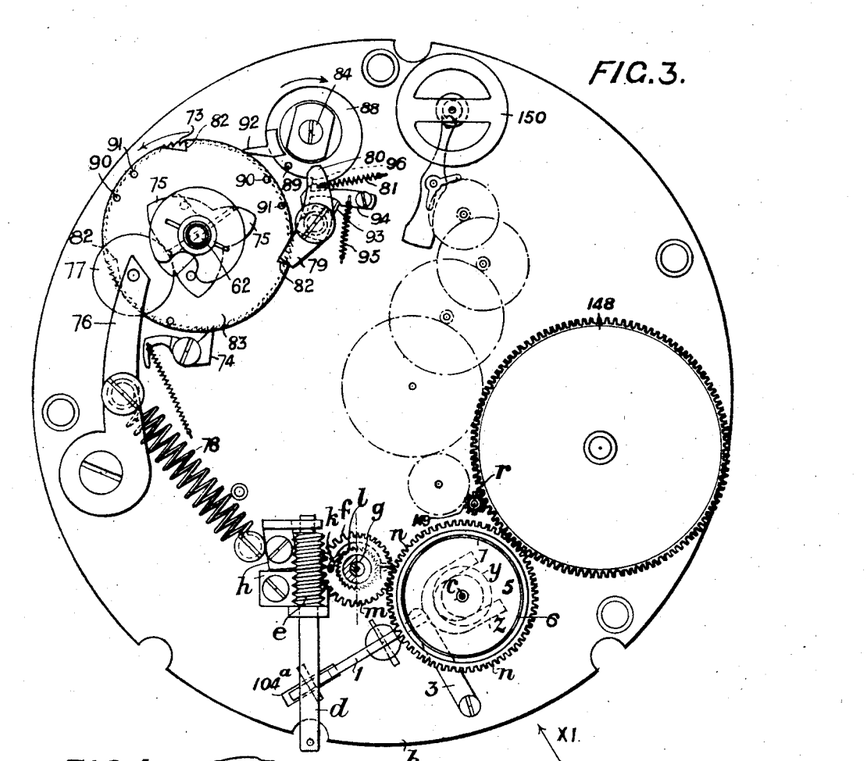
Figure 3 is a front elevation of the rear frame plate, as seen when the front plate is removed, the parts being in the "For hire" position.
Figure 4:
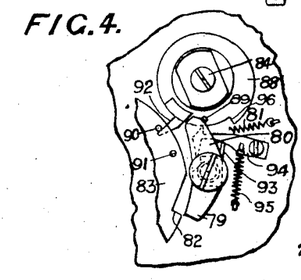
Figure 4 is a view of flag shaft locking and releasing means in a different position from that seen in Figure 3.
Figure 5:
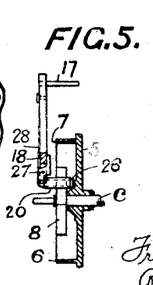
Figure 5 is a detail view of the transmission lever and flanged disc on the main driving spindle.

The flag shaft 62 is adapted to be rotated step by step, in one direction only, as stated in the opening paragraphs of this specification. For this purpose the flag spindle has a ratchet 73, see Figures 3 and 13, on the inner or front face of the back plate b and on the latter is a detent 74 engaging the ratchet 73, so that, when viewed from the front, the flag and flag shaft 62 can be turned only in the counter-clockwise direction. In addition to the "For hire" and "Hired" positions of the flag, it is desirable to provide an intermediate position designated a "Stopped" position, in which the clock is stopped so that no further addition can be made by it to the indicated fare, the latter being left displayed until the fare has been paid, or any dispute thereon settled, whereupon the flag is moved to the "For hire" position. For this purpose a trefoil cam 75 is fixed to the flag shaft 62 and a lever arm 76, carrying an anti-friction roller 77 for bearing upon the cam 75 is operated upon by a strong spring 78 for registering or retaining the cam shaft 62 in any one of the three positions aforesaid. In addition to the ratchet 73 and pawl 74 for ensuring that the flag shaft 62 turns only in one direction, it is important that locking means be provided for ensuring that the flag shaft may be turned only one step at a time. For this purpose a locking detent 79 with a tail 80 is pivotally mounted on the inner face of the back plate and is adapted, under the action of a spring 81 to engage with any one of three notches 82 in the periphery of a locking disc 83 fixed on the flag shaft 62. The locking detent 79 is released by a releasing means which also must be controlled, so as to ensure a single step movement of the flag shaft 62, that is to say through about 120° only at a time. The releasing means illustrated comprise a small spindle 84 which can be turned by a knob 85 (Figure 14) in one direction only, owing to a detent 86 (Figure 10) on the rear face of the back plate *b* engaging a ratchet 87 fixed on the spindle 84. On the inner face of the back plate *b* and on the spindle 84, (see Figure 3) is fixed a disc 88 carrying near its periphery a release pin 89. The disc 88 can be turned only in the opposite direction to that in which the flag shaft 62 turns, that is to say clockwise as viewed from the front in Figure 3. The turning of the disc 88 brings the release pin 89 to a position in which it engages the tail 80 of the locking detent 79 and removes the latter from engagement with a notch 82 in the disc 83, so that the flag shaft is then free to be turned. In advance of each notch 82, there are provided two spaced pins 90 and 91 and a tongue 92 on the disc 88 enters the space between these pins 90, 91 when the release pin 89 is in position for withdrawing the detent 70 all as clearly shown in Figure 4. Indeed the forward pin 90 of the pair acts as a stop for the tongue 92 and the spindle 84 cannot be readily turned after the tongue has engaged this stop. If the flag shaft 62 now be turned, the rear pin 91 of the pair in question engages the tongue 92 and turns the disc 88 through a small angle, namely to the position seen in Figure 3, this angle being sufficient for taking the release pin 89 past the tail 80 of the locking detent 79, the pin 89 having now no function, as the detent 79 is wiping upon the periphery of the disc 83 between the notches 82, until the said detent 79 enters the next notch 82, as seen in Figure 3. When the detent 79 is in this withdrawn position, a projection 93 on its hub portion engages and lifts a catch 94 against the action of a spring 95 and the nose of this catch 94 then lies in the path of a tooth 96 on the disc 88, the tooth 96 being conveniently formed by notching the periphery of the disc 88. Thus, for so long as the locking detent 79 remains in the withdrawn position, as seen in Figure 4, it is impossible to turn the releasing disc 88 through another revolution so as to get the releasing pin 89 behind the tail 80 and hold the detent 79 out of action while the flag shaft is turned through several steps. As soon, however, as the next notch 82 is brought opposite the detent 79, the latter is free to slip into that notch and to lock the disc 83, as seen in Figure 3, and therefore also the flag shaft. This entry of the detent 79 permits the catch 94 to be lowered by its spring 95 so that the release knob 85 may now be turned to bring the release pin 89 again into the releasing position. The operator is therefore compelled to perform a certain sequence in making any movement of his flag from one position to another, and it is not possible for him to vary that sequence, or to do anything which would enable him to perform two or more steps in the movement of the flag and flag shaft with only one releasing operation. With this locking arrangement it is not feasible to manipulate the mechanism in any way so as to produce a false indication.

Figure 14:
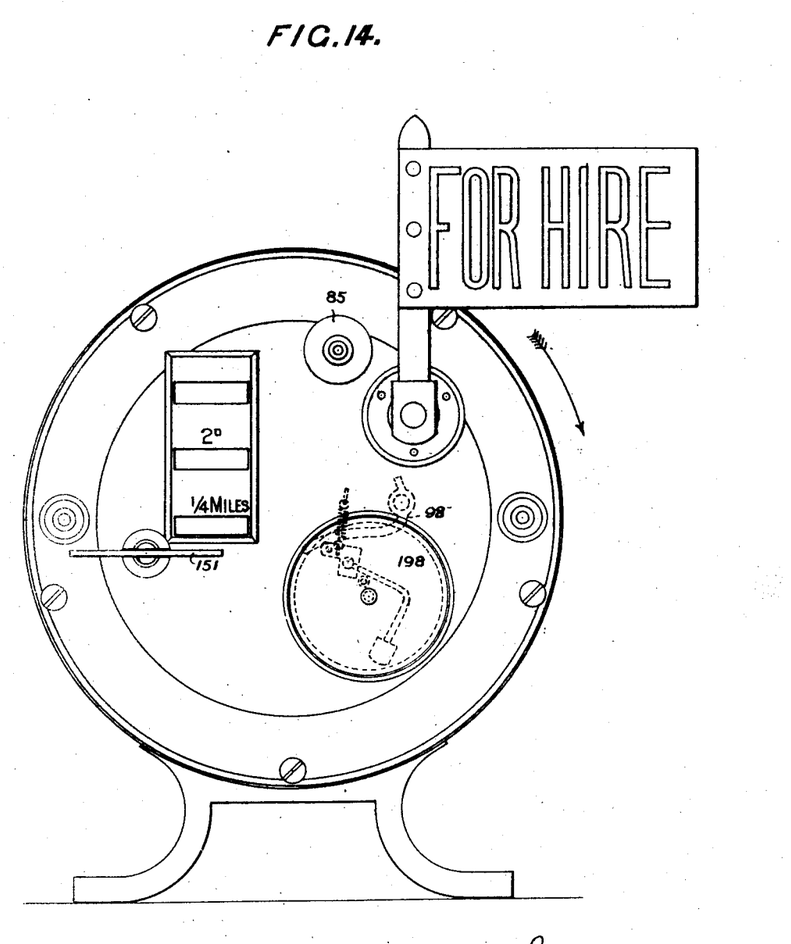
Figure 14 is a rear view of the casing of the meter to a smaller scale.

For audibly announcing the adjustment of the flag shaft to a new position, the said flag shaft 62 may be fitted with three projections 97 for operating a lever 98, see Figures 10 and 14, in operative connection with a bell 198 on the rear cover plate of the casing of the taximeter.

Figure 13:
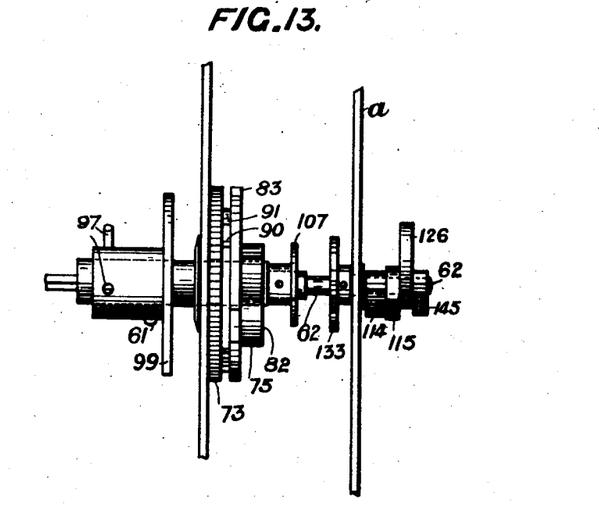
Figure 13 is a detail view of the flag shaft and its cams.

For controlling the declutching of the road drive there is a cam 99, see Figures 10 and 13 on the flag shaft 62 just behind the back plate *b* and an antifriction roll 100 on a two-armed lever 101 engages the periphery of the cam 99. When the full radius of the cam 99 is operative on the lever 101, the lower arm of the latter is moved out against the action of its spring 102 so that a cam slide 103, see also Figure 11, depresses a projection 104 on the end of the lever 1, (the said projection 104 extending through a slot 104ª in the back plate *b*) so that the lever 1 is operated to withdraw the projections 2 and permit the clutch pawls *o* to engage the ratchet *p*. When the cam 99 is turned so that its depression comes opposite the roller 100, as seen in Figure 10, the spring 102 pulls over the lever 101 and removes the slide cam 103 from the lever 1, whereupon the blade spring 3 operates the lever 1 in the direction for entering the projections 2 and spreading the pawls *o* so that they no longer engage the ratchet *p*. This takes place in the "For hire" position of the flag in which the road drive is not communicated to the main driving spindle *c*. After the withdrawal of the slide cam 103 as just described, a pointed end 105, Figures 10 and 11, of the lever 101 engages a heart cam 106 on the rear end of the main driving spindle *c* and exerts a zeroizing or re-setting action that is to say, it turns the shaft *c* to the position in which the gap 7 in the flange 6 is just in advance of the position to which the roller 20 on the transmission lever 18 descends when the flag is set to the "Hired" position.

At the termination of a journey or hiring, the flag is turned from the "Hired" position to the "Stopped" position in which it is necessary to stop the clock so that in the event of any dispute, for example, no addition is made to the fare indication owing to the clock continuing to work whilst the dispute is taking place. The stopping of the clock is accomplished by means of a cam 107, see Figure 7, on the flag shaft 62, this cam being situated between the front and back plates $a$ and $b$ as will be seen from Figure 13, and operating upon a two-armed lever 108, Figure 7, so as to cause a blade spring 109 on the lever 108 to press as a brake upon the balance wheel 150 of the clock (seen also in Figure 3) and stop the latter.

Figure 15:
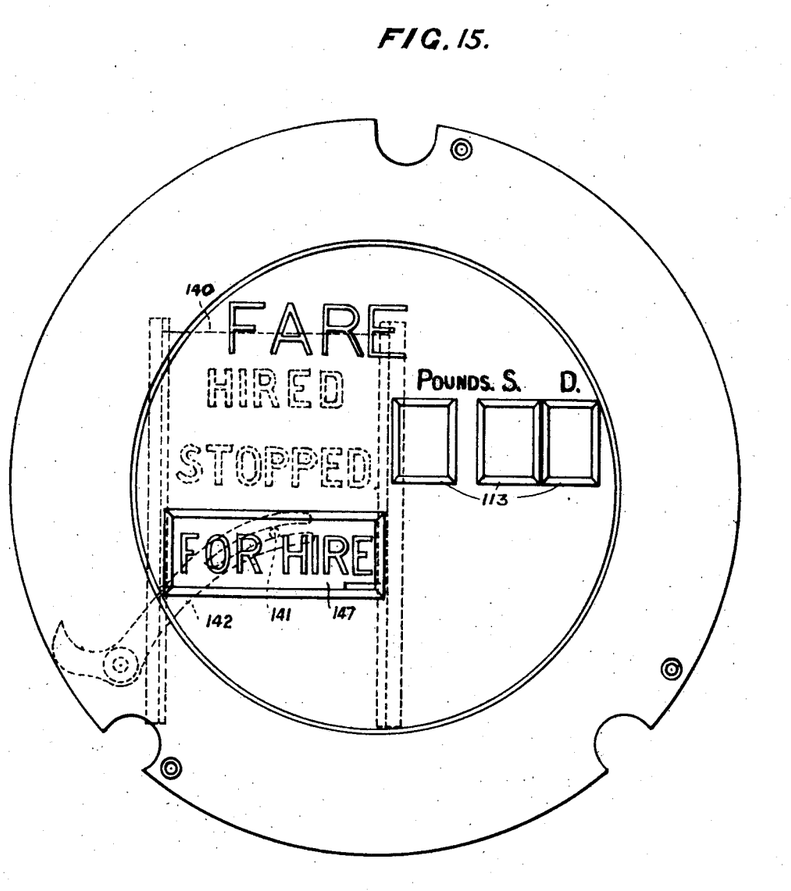
Figure 15 is a front elevation, to the same scale as Figures 1 to 13, of the front dial face of the meter, this dial face being situated just behind the glass front of the meter casing.

The shutter 22 is carried by a lever 110 see Figures 1 and 6, pivoted at 111, a spring 112 constantly tending to turn the lever arm 110 for lowering the shutter 22 over those portions of the pence, shillings and pounds dials which are visible through the windows 113, Figure 15, in the front dial of the meter. A cam 114, Figures 1, 2, 6 and 13, on the flag shaft 62 is designed so as to raise the shutter during the "Hired" and "Stopped" positions and to lower it during the "For hire" position of the flag.

The pence, shillings and pounds dials are zeroized with all that that entails, and the main driving spindle is set as aforesaid, during the turning of the flag from the "Stopped" to the "For hire" position. The setting of the shaft $c$ by the lever 101 and the heart cam 160 has been already described. The releasing actions necessary for permitting the zeroizing actions to take place are performed by a cam 115 on the flag shaft 62. The cam 115 is designed and set so as to operate the long arm 116, Figures 1 and 6, of a lever 116, 117 pivoted on the front plate $a$. The short arm 117 of the lever carries a pin 118 that presses against the tail or second arm 42 of the transmitting lever 18, when the cam 115 operates, and raises the lever 18 to the position seen in Figure 1, so as to carry the roller 20 well above the flange 6 of the disc 5. The crank or projection 4 on the arm $u$, is engaged by the lever 18 in rising to this position and lifts the arm $u$ also, thereby taking the pinion $t$ completely out of mesh with the clock-driven pinion $q$. It will be observed that when the lever 18 is raised thus, the pin 67 on the front lever arm 66 comes out of the slot of the projection 68 and rides on the incline of that projection, so that the counter 57 is not operated. The tail 42 of the lever 18, during this movement, presses against the roller or projection 43 on the lever 36 carrying the feed pawl 34 of the shillings dial, thereby moving the lever 36 back and taking the pawl 34 out of range of the shillings ratchet 31. A pin 122 on the lever 36, during this movement, engages the lever 33 carrying the detent 32 and releases the latter from the shillings ratchet 31, against the action of a spring 123 connected with the tail of the detent lever 33. The rising of the lever 18, moreover, takes the pin 17 thereon out of range of the heel 16 of the pence lever 9 and the spring 25 then operates the pence lever to move its feed pawl 10 out of range of the pence ratchet 11. The parts are thus free for the re-setting of the driving spindle $c$, for the zeroizing of the pence dial, and for the zeroizing of the shillings dial.

The zeroizing of the pence dial is performed by a lever 125 under control of a cam 126 of the flag shaft. In turning the flag from the "Stopped" to the "For Hire" position, the tail of the lever 125 enters the depression of the cam 126 owing to the action of the spring 127, and the roller 128 on the lever 125 is brought into operative engagement with the heart cam 129 on the pence dial spindle, thereby zeroizing the pence dial, or re-setting the pence dial to minimum fare as above explained.

The zeroizing of the shillings dial is performed by a lever 130, 131 just behind the front plate $a$, as seen in Figures 7 and 8. This lever is of the bell-crank variety and on one arm is fitted a roller 132 which enters a depression in a cam 133 on the flag shaft 62, when the latter is turned to the "For hire" position. The other arm 131 of this lever is connected with an operating spring 134, and has its end forked, one prong carrying a roller 135 for engaging a heart cam 136 on the shillings dial tubular spindle 30 and the other prong carrying a roller 137 for engaging a heart cam 138 on the pounds dial spindle 45. In order to permit of zeroizing the pounds dial, the lever arm 131 is fitted with a projection 139 that engages the lever 50 carryng the feed pawl arm 51 of the dial, so that as the zeroizing lever 130, 131, comes into action, it engages and lifts the lever 50 and the pounds feed pawl arm 51 and lifts the feed pawl 52 clear of the pounds ratchet 47, and immediately after this the pounds dial is zeroized by the well-known action of the roller 137 engaging the heart cam 138.

The various positions of the flag are preferably indicated on the front face of the taximeter by means of a slide 140 bearing the designations "Hired", "Stopped" and "For hire" as seen in Figure 15. On the back of this slide 140 there is a pin 141 engaging the slotted end of a curved lever 142 pivoted on the front plate $a$. The hub of this lever 142 has a cam-shaped projection 143, see also Figures 1 and 6, engaging with a pin 144$^a$ on the lower arm of a two-armed lever 144 which is engaged by a three-stepped cam 145 on the flag shaft 62. A spring 146 counterbalances the weight of the slide 140. In each set position of the flag and flag shaft 62, the cam 145 will operate the levers 144 and 142 to adjust the slide 140 so that the appropriate designation appears at an opening 147, Figure 15, in the front dial of the meter.

Any suitable clock mechanism may be employed, comprising a main spring drum 148, Figure 3 meshing with a pinion 149 on the spindle $r$. Another pinion on the spindle *r* drives a suitable clock train ending in the balance wheel 150 before referred to in connection with the braking action of the brake finger 109. The pinion 149 may be screwed on to its spindle so that in the event of a breakage of the main spring, the pinion 149 is unscrewed on the spindle and the mechanism suffers no harm. The main spring is wound up by means of a handle 151 at the back of the meter, as seen in Figure 14, a pawl 152, see Figure 10, being fitted on the back plate *b* for engaging with a ratchet 153 and preventing unwinding in the well-known manner.

Means may be provided for indicating charges for "Extras" if so desired, but this is not generally required in present circumstances.

Figure 9:
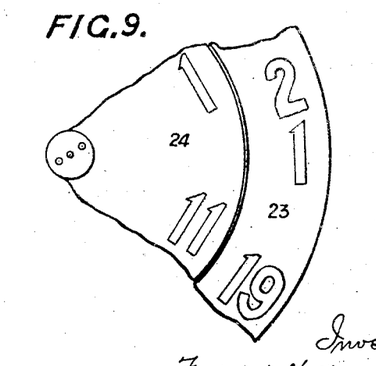
Figure 9 is a front elevation of fragments of the pounds and shillings dials.

Reference to Figures 1, 9 and 15 will show the relatively large size of the numerals capable of being used for indicating the fare with the construction and arrangement of the dials 12, 23, 24 in accordance with these improvements.

Referring to Figure 13, the cams 114, 115, 126, and 145 may be all screwed on to the flag shaft 62, the end portion of such shaft which projects through the front plate *a* being screw-threaded for the purpose. By screwing the cam 114 on to the shaft 62 and tightly against a shoulder on that shaft, and by screwing on the successive cams and tightening them one against another, all these cams will be found securely held on the shaft and in the correct relative angular positions. The cams in question are clearly seen in Figure 2 where they are shown removed from the shaft 62 and laid out as a series.

I claim:—

1. In a taximeter, the combination with a flag arranged to be set to different controlling positions, of a rotatable shaft on which said flag is mounted, means to insure the stepwise movement of said shaft in one direction only, means to positively lock said shaft when it reaches the end of each step and releasing mechanism for said locking means requiring definite operation before releasing said shaft to permit it to move past the limit of each step.

2. In a taximeter, the combination of a register, mechanism for actuating the same, a flag shaft therefor arranged when turned to render said mechanism operative and inoperative, mechanism to permit the flag shaft to rotate in one direction only step by step, means to lock said shaft at each step, means to release said locking means and requiring definite manual operation before said shaft may be turned beyond the limit of any step, and means for rendering the lock-releasing means inoperative during the transition movement from one step to the next following.

3. In a taximeter the combination with a manually operated flag and shaft therefor; of mechanism to permit said shaft to turn step by step in one direction only and comprising a toothed wheel on said shaft having teeth corresponding to said steps, a detent to engage said wheel and manually operated means to release said detent at the end of each step.

4. In apparatus of the character indicated, the combination with a manually-operated flag and flag shaft revoluble step by step in one direction only of a toothed device on the flag shaft, a detent adapted to engage therewith for the purpose of preventing said shaft and thus the flag from turning through more than one step at a time, and releasing mechanism for said detent comprising a revoluble disc provided with a projecting tongue, a releasing pin and a tooth, means on said toothed device adapted to have operative engagement with said tongue for the purpose first of all for limiting the turning of said revoluble disc, and secondly for turning said revoluble disc through a small angle when the flag shaft is turned, means on said detent adapted to be engaged by said releasing pin for the purpose of withdrawing said detent from said toothed device, and a catch under control of said detent and adapted to lie in the path of said tooth when said detent is in the withdrawn position, substantially as and for the purposes set forth.

5. In a taximeter, the combination of a register, mechanism for actuating same, a flag and flag shaft arranged when turned to render said mechanism operative and inoperative, means operative upon said flag shaft to render it revoluble step by step in one direction only at a predetermined number of steps per revolution, a slide plate bearing designations corresponding with the different steps, cam-operated means under control of said flag for setting said slide in an appropriate position corresponding with the adjusted position of the flag, locking means adapted to positively lock the flag at each step, and lock releasing means requiring definite mechanical operation before it is possible to turn the flag beyond the limit of any step, substantially as set forth.

6. In a fare registering and indicating apparatus, the combination of a register, clock mechanism and road wheel driven mechanism for actuating said register, a flag and flag shaft arranged when turned to render said mechanisms operative and inoperative, means operative upon said flag shaft to render it revoluble step by step in one direction only in a predetermined number of steps revolution, one of said steps providing a "Stopped" position of the flag intermediate between the "Hired" and "For hire" positions, means under control of said flag for stopping the clock mechanism in said "Stopped" position of the flag, locking means for positively locking said flag shaft at each step, and lock releasing means requiring definite mechanical operation before it is possible to turn the flag shaft beyond the limit of any step, substantially as set forth.

7. In a taximeter, the combination of a register, driving mechanism therefor, a flag and flag shaft adapted when turned to render said mechanism operative and inoperative, and transmitting mechanism between the driving mechanism and the register comprising a circular track formed with a gap, a cam wheel arranged within said track, and a transmission lever provided with a hingedly-mounted projection which is adapted initially to engage said circular track until minimum fare has been worked off and then to pass through said gap and engage said cam wheel so as to cause said transmission lever, and through it the register to be operated each time that an addition has to be made to the indicated fare.

8. In a taximeter, the combination of a register, driving mechanism therefor, a flag and flag shaft arranged when turned to render said mechanism operative and inoperative, and transmitting mechanism between the driving mechanism and the register comprising a circular track formed with a gap, a star wheel arranged within said track, and a transmission lever provided with a roller which is hingedly mounted on said lever and is adapted to co-operate with both the circular track and the star wheel, substantially as and for the purposes set forth.

9. In a taximeter, the combination with a minimum fare device comprising a circular track formed with a gap, and a transmission lever through which the driving mechanism imparts motion to the register mechanism, said lever having a hingedly-mounted roller thereon for engaging the track and capable of passing through said gap, of a spring operative upon said roller so that the latter may articulate against the action of the spring and wipe over said track upon lifting the transmission lever out of operation, substantially as set forth.

10. In a taximeter, the combination of a transmission lever through which motion is transmitted from the driving mechanism to the register, a minimum fare device operative between the transmission lever and the driving mechanism and consisting of a circular track formed with a gap, a star wheel within said track and movable therewith, a hingedly-mounted roller on said transmission lever adapted to cooperate with both the track and the star wheel and capable of passing through said gap, and a spring operative upon said roller so that the latter may articulate against the action of the spring and wipe over said track upon lifting the transmission lever out of operation, substantially as set forth.

11. In a taximeter, the combination of a register, driving mechanism, a main spindle adapted to be driven by said driving mechanism, a flag and flag shaft arranged when turned to render said mechanism operative or inoperative upon said spindle, a disc on said spindle provided with a circular flange having a gap, a star wheel on said spindle within said flange, a transmission lever provided with a hingedly mounted roller adapted to cooperate with both the flange and the star wheel, and operative connections between said transmission lever and said register, substantially as set forth.

12. In a taximeter, the combination of a register, driving mechanism, a main spindle adapted to be driven by said driving mechanism, a flag and flag shaft arranged when turned to render said mechanism operative or inoperative upon said spindle, a disc on said spindle provided with a circular flange having a gap, a star wheel on said spindle within said flange, a transmission lever provided with a hingedly-mounted roller adapted to cooperate with both the flange and the star wheel, operative connections between said transmission lever and said register, and re-setting means on said main spindle under control of said flag, substantially as set forth.

13. In a taximeter, the combination of a register, road-wheel-driven mechanism, clock mechanism, a main driving spindle, a clutch member loosely mounted on said spindle and geared with the road-wheel-driven mechanism, a co-operating clutch member fixed on said spindle, gearing between said clock mechanism and said spindle, operative connections between said spindle and said register, re-setting means on said spindle, a flag and flag shaft, and operating means between said flag shaft and said clutch and resetting means adapted to disengage the clutch prior to operating the re-setting means, substantially as set forth.

14. In a taximeter, the combination of a register, road-wheel-driven mechanism and clock mechanism, a main driving spindle, gearing between said clock mechanism and said spindle, a pawl and ratchet clutch operative between said road-wheel-driven mechanism and said spindle, a disc fitted with projections in operative relation with the pawls of said clutch for the purpose of removing said pawls from their ratchet, a cam in operative relation with said disc, a flag and flag shaft in operative connection with said cam, and operative connections between said spindle and said register, all substantially as and for the purpose set forth.

15. In a taximeter, the combination of a register, road-wheel-driven mechanism and clock mechanism, a main driving spindle, gearing between said clock mechanism and said spindle, a pawl and ratchet clutch operative between said road-wheel-driven mechanism and said spindle, a disc fitted with projections in operative relation with the pawls of said clutch for the purpose of removing said pawls from their ratchet, a lever for effecting movement of said disc, a cam operative upon said lever, a flag and flag shaft in operative connection with said cam, and operative connections between said spindle and said register, all substantially as and for the purpose set forth.

16. In a taximeter comprising a register, a main driving spindle operatively connected with the register, road wheel-driven mechanism and clock mechanism, and driving connections between said mechanisms and said spindle of such a nature as to allow the road and clock drives to overrun each other, the arrangement according to which the driving connection between the clock and the main spindle comprises a pinion on said spindle and a pinion on an oscillatory arm, the latter allowing the second-mentioned pinion to ride out of mesh with the first-mentioned pinion when the road drive overruns the clock drive, substantially as set forth.

17. In a taximeter, the combination of an intermittently operating register, driving mechanism, a flag and flag shaft adapted when turned to render said driving mechanism operative and inoperative, a double-armed transmission lever means in operative connection with said driving mechanism for lifting said tranmission lever prior to each operation of the register, a spring operative against the lifting of said transmission lever, means under control of one arm of said lever for operating the register dial of lowest fare denomination, and means under control of the other arm of said lever for operating a register dial of higher fare denomination, substantially as set forth.

18. In a taximeter, the combination of an intermittently operating register, driving mechanism, a flag and flag shaft adapted when turned to render said driving mechanism operative and inoperative, a double-armed transmission lever of V-formation, means in operative connection with said driving mechanism for lifting said transmission lever prior to each operation of the register, a spring operative against the lifting of said transmission lever, a lever operative between one arm of said transmission lever and the dial of lowest fare denomination in such manner that the feed operation of said dial is performed during the descent of said transmission lever under the combined action of gravity and said spring, and a feed lever for a dial of higher fare denomination adapted to be set by the other arm of said transmission lever ready for a feeding operation, substantially as set forth.

19. In a taximeter, the combination of an intermittently operating register, driving mechanism, a flag and flag shaft adapted when turned to render said driving mechanism operative and inoperative, a double-armed transmission lever of V-formation, means in operative connection with said driving mechanism for lifting said transmission lever prior to each operation of the register, a spring operative against the lifting of said transmission lever, a lever with a cam-like edge in operative connection with the register dial of lowest fare denomination, a projection on one arm of said transmission lever adapted to operatively engage said cam-like edge, and means in operative connection with the other arm of said transmission lever for operating the other register dials, substantially as set forth.

20. In a taximeter, the combination of a register, having intermittently-operating fares dials, driving mechanism, a flag and flag shaft adapted when turned to render said driving mechanism operative and inoperative, a double-armed transmission lever means in operative connection prior to each operation with said driving mechanism for lifting said transmission lever of said dials, a spring operative against the lifting of said transmission lever, a lever operative between one arm of said transmission lever and the register dial of lowest fare denomination, a feed lever for a register dial of higher fare denomination adapted to be set ready for a feeding operation by the other arm of said transmission lever, and a cam on the spindle of the first dial operative to control the feeding movement of said second feed lever, substantially as set forth.

21. In a taximeter, the combination of a register having intermittently-operating fares dials, driving mechanism, a flag and flag shaft adapted when turned to render said driving mechanism operative and inoperative, a double-armed transmission lever, means in operative connection with said driving mechanism for lifting said transmission lever prior to each operation of said dials, a spring operative against the lifting of said transmission lever; a lever operative between one arm of said transmission lever and the register dial of lowest fare denomination, a feed lever for a register dial of higher fare denomination adapted to be set ready for a feeding operation by the other arm of said transmission lever, a cam on the spindle of the first dial, and a lever operative between said cam and said second feed lever, substantially as and for the purpose set forth.

22. In a taximeter, the combination of a register having intermittently-operating fares dials, driving mechanism, a flag and flag shaft adapted when turned to render said driving mechanism operative and inoperative, a double-armed transmission lever, means in operative connection with said driving mechanism for lifting said transmission lever prior to each operation of said dials, a spring operative against the lifting of said transmission lever, a lever operative between one arm of said transmission lever and the dial of lowest fare denomination, an operative connection between the other arm of said transmission lever and a dial of intermediate fare denomination, a cam on the spindle of the first dial for controlling the operation of the second dial, a feed lever for the dial of highest fare denomination and a cam on the spindle of the second dial for operating said feed lever, substantially as set forth.

23. In a taximeter, the combination of a register having intermittently-operating fares dials, driving mechanism, a flag and flag shaft adapted when turned to render said driving mechanism operative and inoperative, a double-armed transmission lever, means in operative connection with said driving mechanism for lifting said transmission lever prior to each operation of said dials, a spring operative against the lifting of said transmission lever, a lever with a cam-like edge and in operative connection with the dial of lowest fare denomination, a projection on one arm of said transmission lever adapted to operatively engage said cam-like edge, an operative connection between the other arm of said transmission lever and a dial of intermediate fare denomination, a cam on the spindle of the first dial for controlling the operation of the second dial, a feed lever for the dial of highest fare denomination and a cam on the spindle of the second dial for operating said feed lever, substantially as set forth.

24. In a taximeter, the combination of driving mechanism, a flag and flag shaft adapted when turned to render said driving mechanism operative and inoperative, cam and lever mechanism in operative connection with said driving mechanism, and fares indicating dials operated by said cam and lever mechanism, said fares dials being constructed and arranged whereby the dial of highest fare denomination is concentric with a dial of intermediate fare denomination and the dial of lowest fare denomination is to one side of said dial of intermediate fare denomination for permitting relatively large numerals to be employed for indicating the fare, substantially as set forth.

25. In a taximeter, the combination of a register, road-wheel driven mechanism and clock mechanism, a main driving spindle, clutching means between said road-wheel driven mechanism and said spindle, driving connection between said clock mechanism and said spindle, said spindle being in operative connection with said register, zeroizing means for said register, a flag and flag shaft, means operative upon said flag shaft for ensuring that the flag shall turn step by step in one direction only, and a series of cams on said flag shaft, operative not only to bring about the operation of said zeroizing means, but also by one cam to actuate said clutching means to declutch said road-wheel driven mechanism and by another cam to break said driving connection between said clock mechanism and said spindle, so that the latter is free to be moved to its initial position, substantially as set forth.

26. In a taximeter, the combination with a register having intermittently-operating fares dials, of driving mechanism, feeding devices for said dials in operative connection with the driving mechanism, a flag and flag shaft arranged when turned to render said driving mechanism operative and inoperative, means operative upon said flag shaft for ensuring that the flag shall turn step by step in one direction only, zeroizing and re-setting means for said dials under control of said flag, and an operative connection between the zeroizing mechanism of the dials of highest and intermediate fare denominations and the feeding device of the former dial whereby said feeding device is moved out of operative range as said zeroizing mechanism goes into action, substantially as set forth.

27. In a taximeter, the combination with a register having intermittently-operating fares dials, of driving mechanism, lever feeding devices for said dials in operative connection with the driving mechanism, a flag and flag shaft arranged when turned to render said driving mechanism operative and inoperative, means operative upon said flag shaft for ensuring that the flag shall turn step by step in one direction only, zeroizing and re-setting levers for said dials under control of said flag, and an operative connection between the zeroizing lever of the dials of highest and intermediate fare denominations and the feeding lever of the former dial whereby said feeding lever is moved out of operative range as said zeroizing mechanism goes into action, substantially as set forth.

28. In a taximeter, the combination with a manually-operated flag and flag shaft mounted on the frame of the taximeter, of a ratchet wheel on said shaft, a pawl on said frame in engagement with said ratchet wheel for ensuring that said flag shall turn in one direction only, a trefoil cam on said shaft, a lever pivoted on said frame, an antifriction roller mounted on said lever in operative relation with said cam, a strong spring operative upon said lever for registering the cam and thus the flag in any one of three positions, a toothed plate on the flag shaft, a detent adapted to engage therewith for preventing said shaft and thus the flag from turning through more than one step at a time, intermittently operatable releasing means for said detent comprising a disc revoluble on said frame, and provided with a projecting tongue, a releasing pin and a tooth, pins on said toothed plate adapted to have operative engagement with said tongue, a tail on said detent adapted to be engaged by said releasing pin, a catch pivoted on said frame, a projection on said detent adapted to engage said catch and move it into the path of said tooth on said disc, and springs operative upon said detent and catch, all substantially as and for the purpose set forth.

29. In a taximeter, the combination of a register having a "pounds" dial arranged concentric with the "shillings" dial and a "pence dial" arranged to one side of the "shillings" dial, driving mechanism, a main spindle adapted to be driven by said driving mechanism, a flag and flag shaft arranged when turned to render said driving mechanism operative and inoperative upon said spindle, a star wheel on said spindle, a transmission lever adapted to have operative engagement with said star wheel, a feed lever for said "pence" dial, means on said transmission lever for engaging said pence feed lever, a feed lever for said "shillings" dial, a tail on said transmission lever having operative connection with said shillings feed lever, a cam on the spindle of said "pence" dial for controlling the operation of said shillings feed lever, a feed lever for said "pounds" dial and a cam on the "shillings" dial spindle for operating said pounds feed lever, substantially as set forth.

FREDRICK WILLIAM PHILLIPS.